(12) United States Patent
Zhang

(10) Patent No.: US 12,513,252 B2
(45) Date of Patent: Dec. 30, 2025

(54) INFORMATION PROCESSING APPARATUS, APPARATUS, SYSTEM, AND NON-TRANSITORY COMPUTER READABLE MEDIUM, FOR SELECTIVE AQUISITION OF IMAGE DATA FROM SERVER AND FROM INFORMATION PROCESSING APPARATUS

(71) Applicant: FUJIFILM Business Innovation Corp., Tokyo (JP)

(72) Inventor: Wenjin Zhang, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 565 days.

(21) Appl. No.: 17/868,090

(22) Filed: Jul. 19, 2022

(65) Prior Publication Data

US 2023/0308556 A1 Sep. 28, 2023

(30) Foreign Application Priority Data

Mar. 24, 2022 (JP) .................................. 2022-049098

(51) Int. Cl.
*H04N 1/00* (2006.01)

(52) U.S. Cl.
CPC ..... *H04N 1/00244* (2013.01); *H04N 1/00209* (2013.01)

(58) Field of Classification Search
CPC ........... H04N 1/00244; H04N 1/00209; H04N 1/00217
See application file for complete search history.

(56) References Cited

U.S. PATENT DOCUMENTS

| | | | |
|---|---|---|---|
| 9,817,621 B2 | 11/2017 | Ochi et al. | |
| 2012/0287465 A1* | 11/2012 | Mizoguchi | G06F 3/1204 358/1.15 |
| 2014/0071476 A1* | 3/2014 | Aritomi | G06F 21/608 358/1.14 |
| 2015/0199655 A1* | 7/2015 | Carey | H04N 1/00061 358/1.15 |
| 2015/0199656 A1* | 7/2015 | Carey | H04N 1/00079 358/1.15 |
| 2016/0080585 A1* | 3/2016 | Kobayashi | G06F 3/1267 358/1.15 |
| 2016/0277631 A1* | 9/2016 | Mori | G06F 3/1273 |

(Continued)

FOREIGN PATENT DOCUMENTS

| | | |
|---|---|---|
| JP | 2013-117904 A | 6/2013 |
| JP | 2014-45311 A | 3/2014 |
| JP | 2018-185869 A | 11/2018 |

OTHER PUBLICATIONS

Nov. 4, 2025 Office Action issued in Japanese Patent Application No. 2022-049098.

*Primary Examiner* — Nicholas Pachol
(74) *Attorney, Agent, or Firm* — Oliff PLC

(57) ABSTRACT

An information processing apparatus includes a processor configured to: when receiving an image forming instruction issued to an image forming apparatus, transmit image data and processing information to a server, the processing information including information for forming an image represented by the image data, and store the image data into the information processing apparatus; and perform control for transmitting the image data to the image forming apparatus in response to a request from the server for transmission of the image data.

13 Claims, 9 Drawing Sheets

(56) References Cited

U.S. PATENT DOCUMENTS

| | | | |
|---|---|---|---|
| 2017/0090825 A1* | 3/2017 | Osadchyy | G06F 3/1286 |
| 2017/0371598 A1* | 12/2017 | Mori | G06F 3/121 |
| 2019/0068741 A1* | 2/2019 | Mukai | H04L 67/568 |
| 2019/0317705 A1* | 10/2019 | Nakatani | G06F 3/1207 |
| 2020/0177743 A1* | 6/2020 | Ando | H04N 1/00198 |

* cited by examiner

INFORMATION PROCESSING APPARATUS, APPARATUS, SYSTEM, AND NON-TRANSITORY COMPUTER READABLE MEDIUM, FOR SELECTIVE AQUISITION OF IMAGE DATA FROM SERVER AND FROM INFORMATION PROCESSING APPARATUS

CROSS-REFERENCE TO RELATED APPLICATIONS

This application is based on and claims priority under 35 USC 119 from Japanese Patent Application No. 2022-049098 filed Mar. 24, 2022.

BACKGROUND

(i) Technical Field

The present disclosure relates to an information processing apparatus, an image forming apparatus, an image forming system, and a non-transitory computer readable medium.

(ii) Related Art

An image forming method is suggested in Japanese Unexamined Patent Application Publication No. 2018-185869. In the image forming method, in a case where, in the process of image formation based on image formation data acquired from an information processing apparatus, the state of an image formation relation unit relating to image formation becomes error and there is image formation data acquired from a server from which image formation is performed after the image formation data acquired from the information processing apparatus, state information regarding the state of the image formation relation unit is notified to the server.

An image forming apparatus is suggested in Japanese Unexamined Patent Application Publication No. 2014-045311. After a user account of a cloud service system is logged in, the image forming apparatus uploads image data in association with an ID to a storage service. Once the upload communication for the image data is completed, the image forming apparatus searches the storage service for the image data using the ID as a key, and verifies that the image data is registered in the storage service. In the case where the image data fails to be registered, the image forming apparatus re-uploads the image data.

SUMMARY

In image formation via a server, a file is downloaded from the server. Therefore, such image formation tends to take a long time compared to image formation via direct connection to an image forming apparatus. However, for example, in the case where direct connection to an image formation apparatus is not able to be established, image formation needs to be performed via a server. It would be troublesome for users to select where to transmit image data, that is, select whether image data is to be stored in the server to form an image or directly transmitted to the image forming apparatus to form an image, every time that image formation needs to be performed.

Aspects of non-limiting embodiments of the present disclosure relate to providing an information processing apparatus, an image forming apparatus, an image forming system, and a non-transitory computer readable medium that are capable of performing image formation without selecting whether image data is to be transmitted to a server or to an image forming apparatus every time that image formation needs to be performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: when receiving an image forming instruction issued to an image forming apparatus, transmit image data and processing information to a server, the processing information including information for forming an image represented by the image data, and store the image data into the information processing apparatus; and perform control for transmitting the image data to the image forming apparatus in response to a request from the server for transmission of the image data.

BRIEF DESCRIPTION OF THE DRAWINGS

Exemplary embodiments of the present disclosure will be described in detail based on the following figures, wherein.

DETAILED DESCRIPTION

Figure 1:
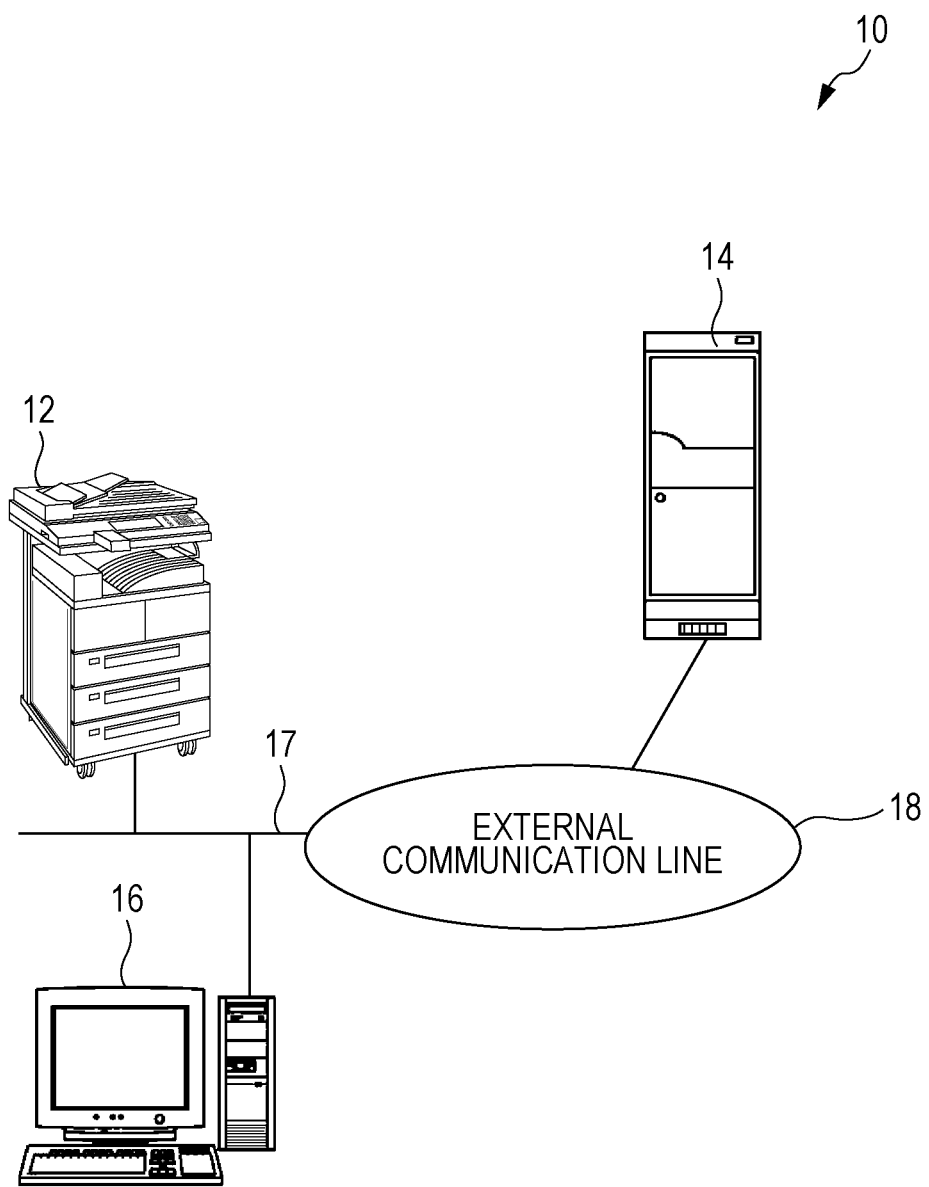
FIG. 1 is a diagram illustrating a schematic configuration of an image forming system according to an exemplary embodiment.

Exemplary embodiments of the present disclosure will be described below with reference to drawings. FIG. 1 is a diagram illustrating a schematic configuration of an image forming system according to an exemplary embodiment.

An image forming system 10 according to an exemplary embodiment includes, as illustrated in FIG. 1, an image forming apparatus 12, a cloud server 14, and an information processing apparatus 16. In this exemplary embodiment, only an image forming apparatus 12, a cloud server 14, and an information processing apparatus 16 are provided. However, a plurality of image forming apparatuses 12, a plurality of cloud servers 14, and a plurality of information processing apparatuses 16 may be provided. Furthermore, the information processing apparatus 16 may be a personal computer or a portable terminal such as a tablet terminal or a smartphone.

The image forming apparatus 12 and the information processing apparatus 16 are connected to an internal communication line 17 such as a local area network (LAN) or an intranet. The internal communication line 17 and the cloud server 14 are connected to an external communication line 18 such as a wide area network (WAN) or the Internet. The image forming apparatus 12, the cloud server 14, and the information processing apparatus 16 are able to perform transmission and reception of various data to and from one another via the internal communication line 17 and the external communication line 18.

Figure 2:
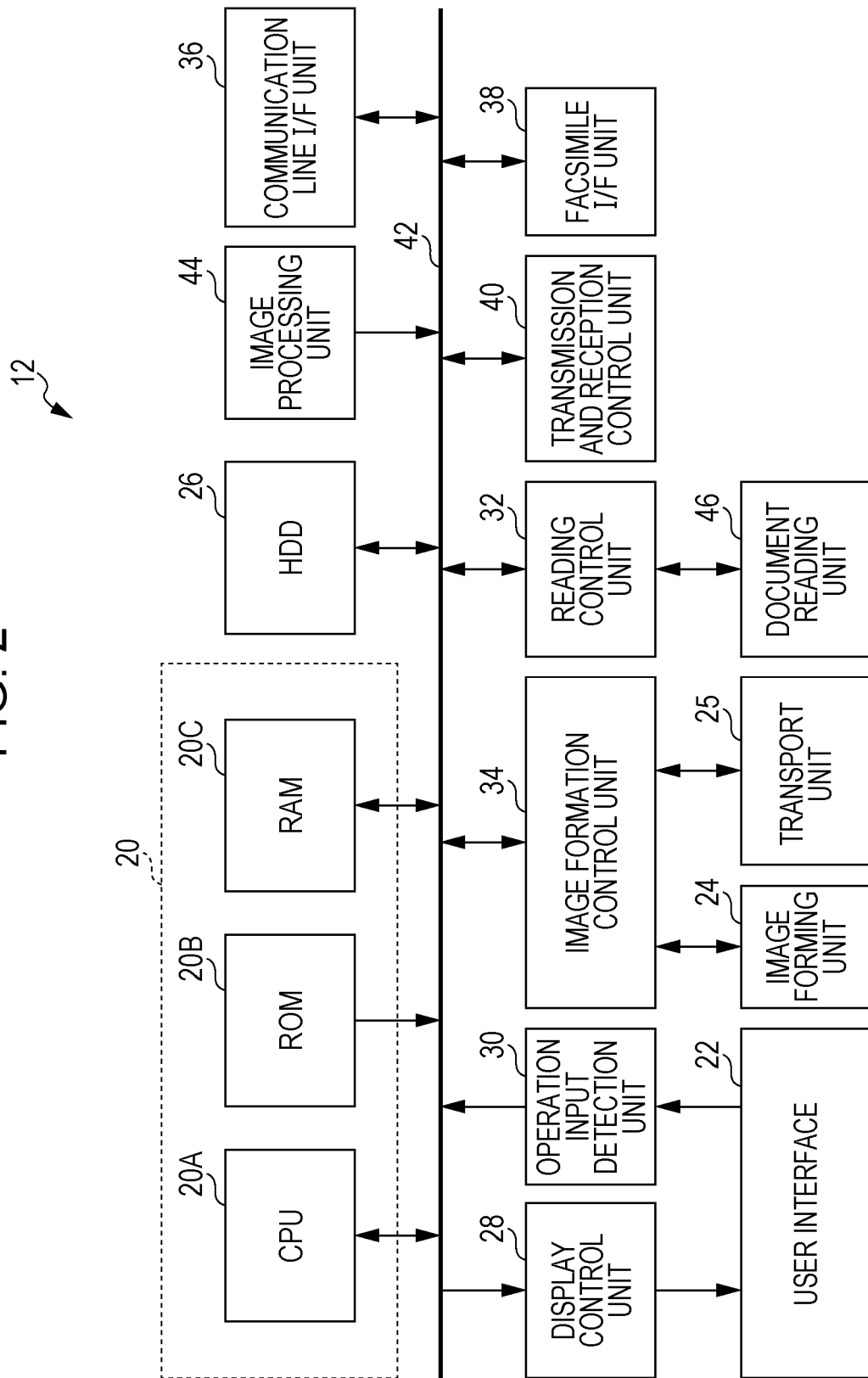
FIG. 2 is a block diagram illustrating a configuration of a principal part of an electrical system of an image forming apparatus according to an exemplary embodiment.

FIG. 2 is a block diagram illustrating a configuration of a principal part of an electrical system of the image forming apparatus 12 according to an exemplary embodiment.

The image forming apparatus 12 according to this exemplary embodiment includes, as illustrated in FIG. 2, a control unit 20 including a central processing unit (CPU) 20A as an example of a second processor, a read only memory (ROM) 20B, and a random access memory (RAM) 20C. The CPU 20A manages the overall operation of the image forming apparatus 12. The RAM 20C is used as a work area or the like when various programs are executed by the CPU 20A. Various control programs, various parameters, and the like are stored in advance in the ROM 20B. In the image forming apparatus 12, components of the control unit 20 are electrically connected to one another by a system bus 42.

In addition, the image forming apparatus 12 according to this exemplary embodiment includes a hard disk drive (HDD) 26 in which various data, application programs, and the like are stored. The image forming apparatus 12 also includes a display control unit 28 that is connected to a user interface 22 and controls display of various operation screens and the like on a display of the user interface 22. The image forming apparatus 12 also includes an operation input detection unit 30 that is connected to the user interface 22 and detects an operation instruction input via the user interface 22. In the image forming apparatus 12, the HDD 26, the display control unit 28, and the operation input detection unit 30 are electrically connected to the system bus 42. An example of the image forming apparatus 12 according to this exemplary embodiment that includes the HDD 26 will be described below. However, the image forming apparatus 12 does not necessarily include the HDD 26 and may include a non-volatile storing unit such as a flash memory.

Furthermore, the image forming apparatus 12 according to this exemplary embodiment includes a reading control unit 32 that controls an optical image reading operation by a document reading unit 46 and a document feeding operation by a document transport unit and an image formation control unit 34 that controls image formation processing by an image forming unit 24 and transport of paper to the image forming unit 24 by a transport unit 25. The image forming apparatus 12 also includes a communication line interface (communication line I/F) unit 36 that is connected to the internal communication line 17 and performs transmission and reception of communication data to and from other external apparatuses such as the cloud server 14 connected to the internal communication line 17 and an image processing unit 44 that performs various types of image processing. The image forming apparatus 12 further includes a facsimile interface (facsimile I/F) unit 38 that is connected to a telephone line, which is not illustrated in drawings, and performs transmission and reception of facsimile data to and from a facsimile apparatus connected to the telephone line. The image forming apparatus 12 also includes a transmission and reception control unit 40 that controls transmission and reception of facsimile data via the facsimile I/F unit 38. In the image forming apparatus 12, the transmission and reception control unit 40, the reading control unit 32, the image formation control unit 34, the communication line I/F unit 36, the facsimile I/F unit 38, and the image processing unit 44 are electrically connected the system bus 42.

With the configuration described above, in the image forming apparatus 12 according to this exemplary embodiment, the CPU 20A accesses the RAM 20C, the ROM 20B, and the HDD 26. Furthermore, in the image forming apparatus 12, the CPU 20A causes the display control unit 28 to control display of an operation screen and information such as various messages on the display of the user interface 22. In the image forming apparatus 12, the CPU 20A causes the reading control unit 32 to control operations of the document reading unit 46 and the document transport unit. In the image forming apparatus 12, the CPU 20A causes the image formation control unit 34 to control operations of the image forming unit 24 and the transport unit 25 and causes the communication line I/F unit 36 to control transmission and reception of communication data. In the image forming apparatus 12, the CPU 20A causes the transmission and reception control unit 40 to control transmission and reception of facsimile data by the facsimile I/F unit 38. Furthermore, in the image forming apparatus 12, the CPU 20A understands content of an operation using the user interface 22 on the basis of operation information detected by the operation input detection unit 30 and performs various types of control based on the content of the operation. Hereinafter, forming an image on paper may be referred to as printing.

Figure 3:
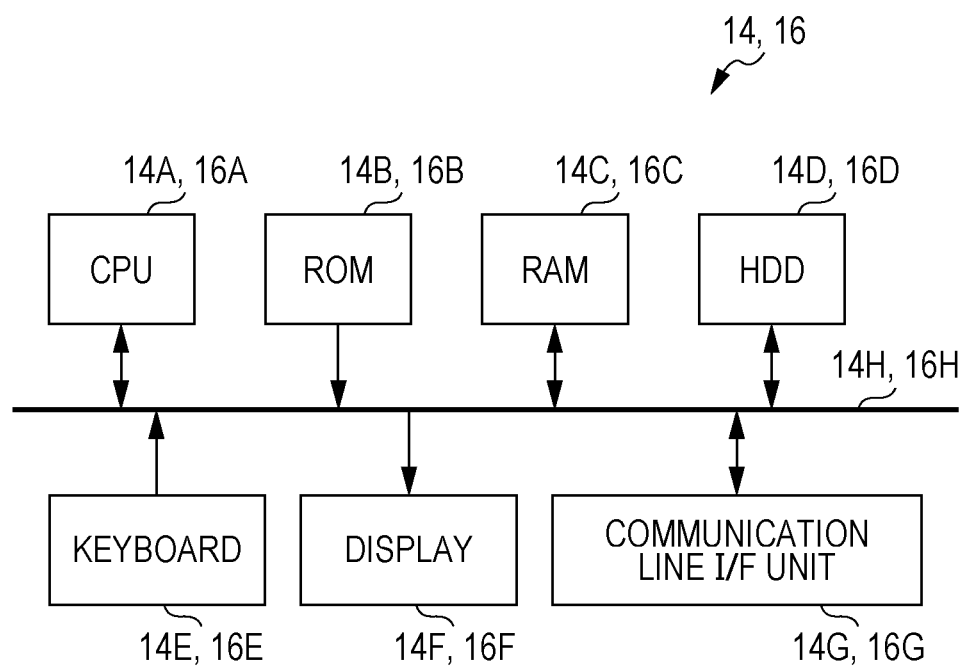
FIG. 3 is a block diagram illustrating a configuration of a principal part of an electrical system of a cloud server and an information processing apparatus according to an exemplary embodiment.

Now, a configuration of a principal part of an electrical system of the cloud server 14 and the information processing apparatus 16 in this exemplary embodiment will be described. FIG. 3 is a block diagram illustrating a configuration of a principal part of an electrical system of the cloud server 14 and the information processing apparatus 16 in this exemplary embodiment. Basically, the cloud server 14 and the information processing apparatus 16 each have a configuration of a typical computer. Thus, a configuration of a principal part of the electrical system of the cloud server 14 will be described as a representative. Explanation for a configuration of a principal part of the electrical system of the information processing apparatus 16 will be omitted, and only corresponding reference signs are indicated in FIG. 3.

The cloud server 14 in this exemplary embodiment includes, as illustrated in FIG. 3, a CPU 14A, a ROM 14B, a RAM 14C, an HDD 14D, a keyboard 14E, a display 14F, and a communication interface (I/F) unit 14G. The CPU 14A manages the overall operation of the cloud server 14. Various control programs, various parameters, and the like are stored in advance in the ROM 14B. The RAM 14C is used as a work area or the like when various programs are executed by the CPU 14A. Various data, application programs, and the like are stored in the HDD 14D. The keyboard 14E is used to input various types of information. The display 14F is used to display various types of information. The communication line I/F unit 14G is connected to the external communication line 18 and performs transmission and reception of various data to and from other apparatuses connected to the external communication line 18. The components of the cloud server 14 described above are electrically connected to one another by a system bus 14H. An example of the cloud server 14 in this exemplary embodiment that includes the HDD 14D will be described below. However, the cloud server 14 does not necessarily include the HDD 14D and may include a non-volatile storing unit such as a flash memory. A communication line interface (I/F) unit 16G of the information processing apparatus 16 is connected to the internal communication line 17 and performs transmission and reception of various data to and from other apparatuses connected to the internal communication line 17.

With the configuration described above, in the cloud server 14 in this exemplary embodiment, the CPU 14A accesses the ROM 14B, the RAM 14C, and the HDD 14D, acquires various data using the keyboard 14E, and displays various types of information on the display 14F. Furthermore, in the cloud server 14, the CPU 14A controls transmission and reception of communication data via the communication line I/F unit 14G. A CPU 16A corresponds to an example of a first processor.

Figure 4:
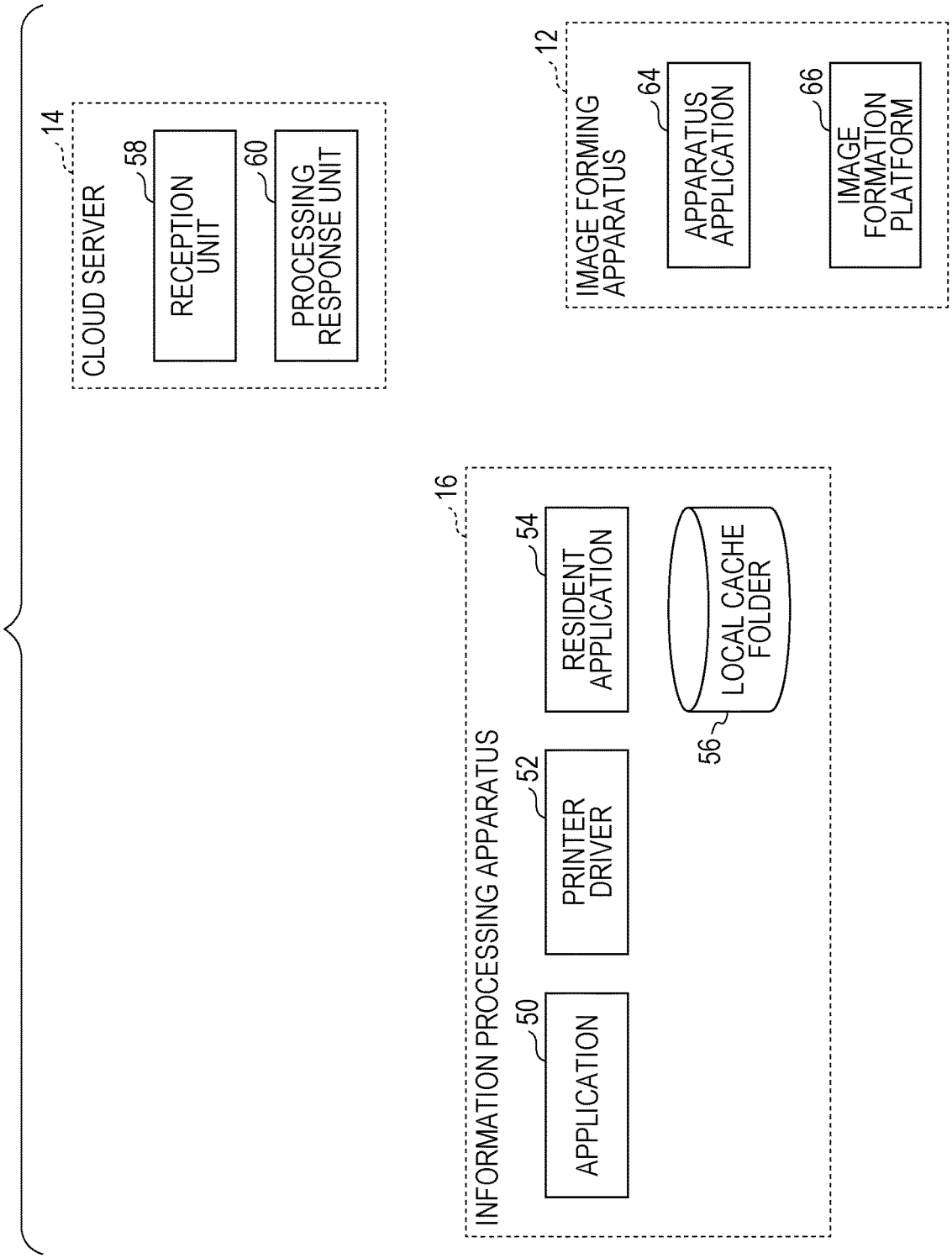
FIG. 4 is a functional block diagram illustrating a functional configuration of units in an image forming system according to an exemplary embodiment.

Next, a functional configuration of units in the image forming system 10 according to this exemplary embodiment configured as described above will be described. FIG. 4 is a functional block diagram illustrating a functional configuration of the units in the image forming system 10 according to this exemplary embodiment.

The information processing apparatus 16 implements functions of an application 50, a printer driver 52, and a resident application 54 when the CPU 16A executes a program.

The application 50 includes various applications having a printing function running on the information processing apparatus 16. For example, the application 50 includes a web browser, a text editor, and the like.

The printer driver 52 performs processing for creating print data as image data in accordance with an instruction from the application 50 and passing the print data to the resident application 54.

The resident application 54 receives print data from the printer driver 52 and transmits the print data to the image forming apparatus 12 in response to a print data acquisition request from the cloud server 14. The resident application 54 also performs processing for storing print data into a local cache folder 56. The resident application 54 encrypts print data and stores the encrypted print data into the local cache folder 56 so that security of the print data is ensured. However, simplified processing in which non-encrypted print data is stored may be performed. Alternatively, setting as to whether or not to encrypt print data may be performed.

The cloud server 14 implements functions of a reception unit 58 and a processing response unit 60 when the CPU 14A executes a program.

The reception unit 58 receives from the resident application 54 processing information indicating content of processing, such as printing settings, and print data. At this time, the reception unit 58 establishes a WebSocket session and connects to the information processing apparatus 16 until printing is completed. The processing information includes setting conditions for printing, such as the number of copies to be printed, image quality, and color/monochrome, and a document name. The document name may be the original file name or the title of a webpage. The document name varies depending on the application that performs printing.

The processing response unit 60 responds to various requests such as a processing list acquisition request from the apparatus application 64 of the image forming apparatus 12. Furthermore, the processing response unit 60 requests, using the WebSocket, the information processing apparatus 16 for the print data in response to a request for the print data from the image forming apparatus 12.

The image forming apparatus 12 implements functions of the apparatus application 64 and an image formation platform 66 when the CPU 20A executes a program.

The apparatus application 64 includes functions for performing processing for displaying a screen for a processing list and the like on the user interface 22 and for performing a process regarding a token and a function for passing print data acquired from the cloud server 14 or the resident application 54 to the image formation platform 66.

The image formation platform 66 provides a basic function as the image forming apparatus 12, such as display on the user interface 22 and image formation based on print data. For example, the image formation platform 66 includes an application programming interface (API).

Figure 5:
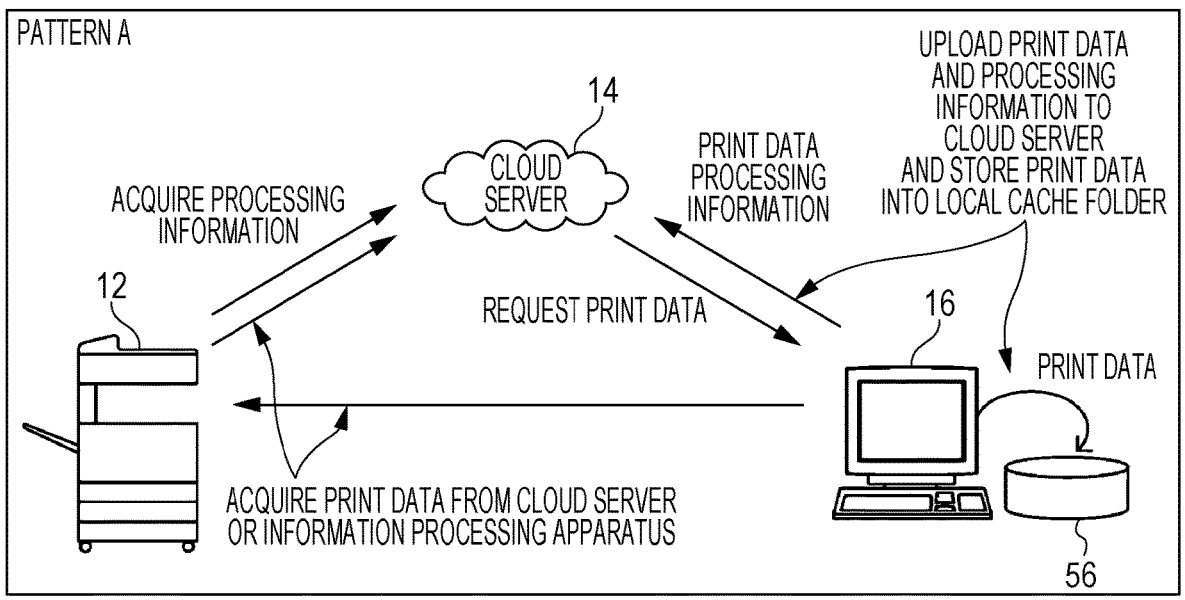
FIG. 5 is a diagram for explaining an example of processing patterns based on which printing is performed by an image forming apparatus in an image forming system according to an exemplary embodiment.
Figure 5:
Figure 5:
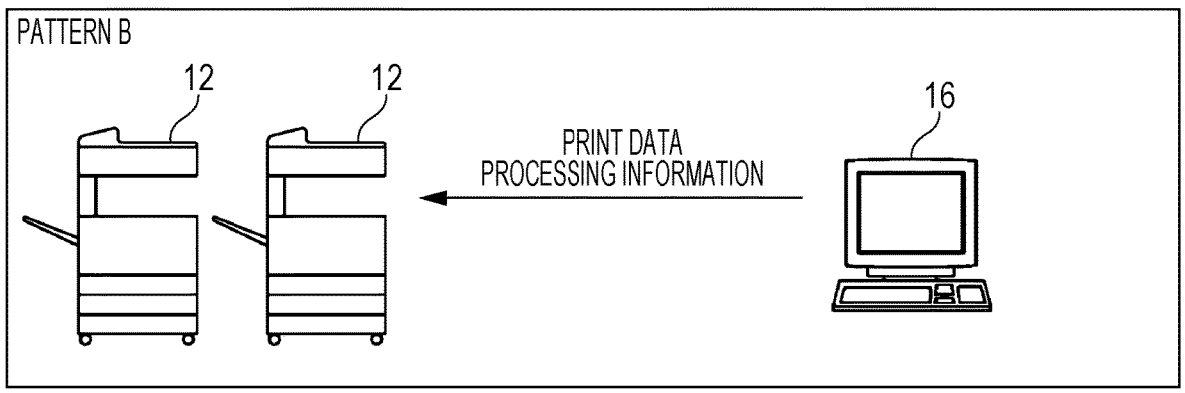

Next, processing patterns based on which printing is performed by the image forming apparatus 12 in the image forming system 10 according to this exemplary embodiment will be described. FIG. 5 is a diagram for explaining examples of processing patterns based on which printing is performed by the image forming apparatus 12 in the image forming system 10 according to this exemplary embodiment.

In the image forming system 10 according to this exemplary embodiment, the image forming apparatus 12 is capable of printing in accordance with two types of processing patterns, that is, pattern A and pattern B.

In this exemplary embodiment, printing is performed in accordance with the pattern A in the case where the information processing apparatus 16 is able to connect to the cloud server 14, and printing is performed in accordance with the pattern B in the case where the information processing apparatus 16 is not able to connect to the cloud server 14.

In the pattern A, the information processing apparatus 16 transmits to the cloud server 14 print data and processing information including information for forming an image represented by the print data, and stores the print data into the local cache folder 56 of the information processing apparatus 16. In printing at the image forming apparatus 12, the image forming apparatus 12 acquires the processing information from the cloud server 14, and acquires the print data from the cloud server 14 or the information processing apparatus 16 to perform printing. More particularly, for acquisition of the print data from the information processing apparatus 16, the cloud server 14 requests the information processing apparatus 16 for the print data, and the information processing apparatus 16 transmits the print data to the image forming apparatus 12. Thus, the print data is acquired from the information processing apparatus 16. Uploading the processing information and the print data to the cloud server 14 and storing the print data into the information processing apparatus 16 are not necessarily performed at the same time. For example, after uploading the processing information and the print data to the cloud server 14, the print data may be stored into the information processing apparatus 16. In this exemplary embodiment, it is assumed that the processing information and the print data are uploaded to the cloud server 14 from the information processing apparatus 16 in accordance with an operation on the information processing apparatus 16 by a user, and after the print data is stored into the information processing apparatus 16, the user moves to the front of the image forming apparatus 12 and performs an operation on the user interface 22, so that printing is performed.

In the pattern B, the processing information and the print data are directly transmitted from the information processing apparatus 16 to the image forming apparatus 12, and the image forming apparatus 12, to which the processing information and the print data are transmitted, performs printing. Alternatively, printing may be performed using an available image forming apparatus 12 on a network, out of preset image forming apparatuses 12, by using a serverless on-demand print (SODP) service in which printing processing transmitted to an image forming apparatus 12 is allowed to be output from another image forming apparatus 12. Furthermore, in the case where the processing information and the print data are directly transmitted to the image forming apparatus 12 from the information processing apparatus 16 in accordance with the pattern B, short range communication (for example, Wi-Fi® or Bluetooth®) may be used.

At the time of uploading the processing information and the print data to the cloud server 14 from the information processing apparatus 16, the timing when the processing information and the print data in the cloud server 14 will be deleted may be selected. For example, a selection may be made among confirming deletion of the processing information and the print data at the time of image formation, not deleting the processing information and the print data, and deleting the processing information and the print data after a predetermined time (for example, fifteen minutes) has passed. Furthermore, a time limit by which print data is to be deleted may be selected for each contract unit such as a tenant. For example, a selection may be made in units of contracts, ranging from an hour to seven days.

Furthermore, the print data stored in the information processing apparatus 16 may be deleted at the time different from the time at which the print data transmitted to the cloud server 14 is deleted. This is because the print data in the information processing apparatus 16 is merely a cache and may be deleted at a time earlier than the time at which the print data in the cloud server 14 is deleted. For example, the print data may be deleted by a predetermined operation of the information processing apparatus 16. Specifically, all the print data may be deleted, as a predetermined operation, at the time when the application 50, which manages the print data in the information processing apparatus 16, ends or starts. Accordingly, as a result, all the print data are deleted at the time of logging out, logging in, and restart. Besides them, the print data in the information processing apparatus 16 may be deleted when a predetermined time (for example, five minutes) has passed.

Figure 6:
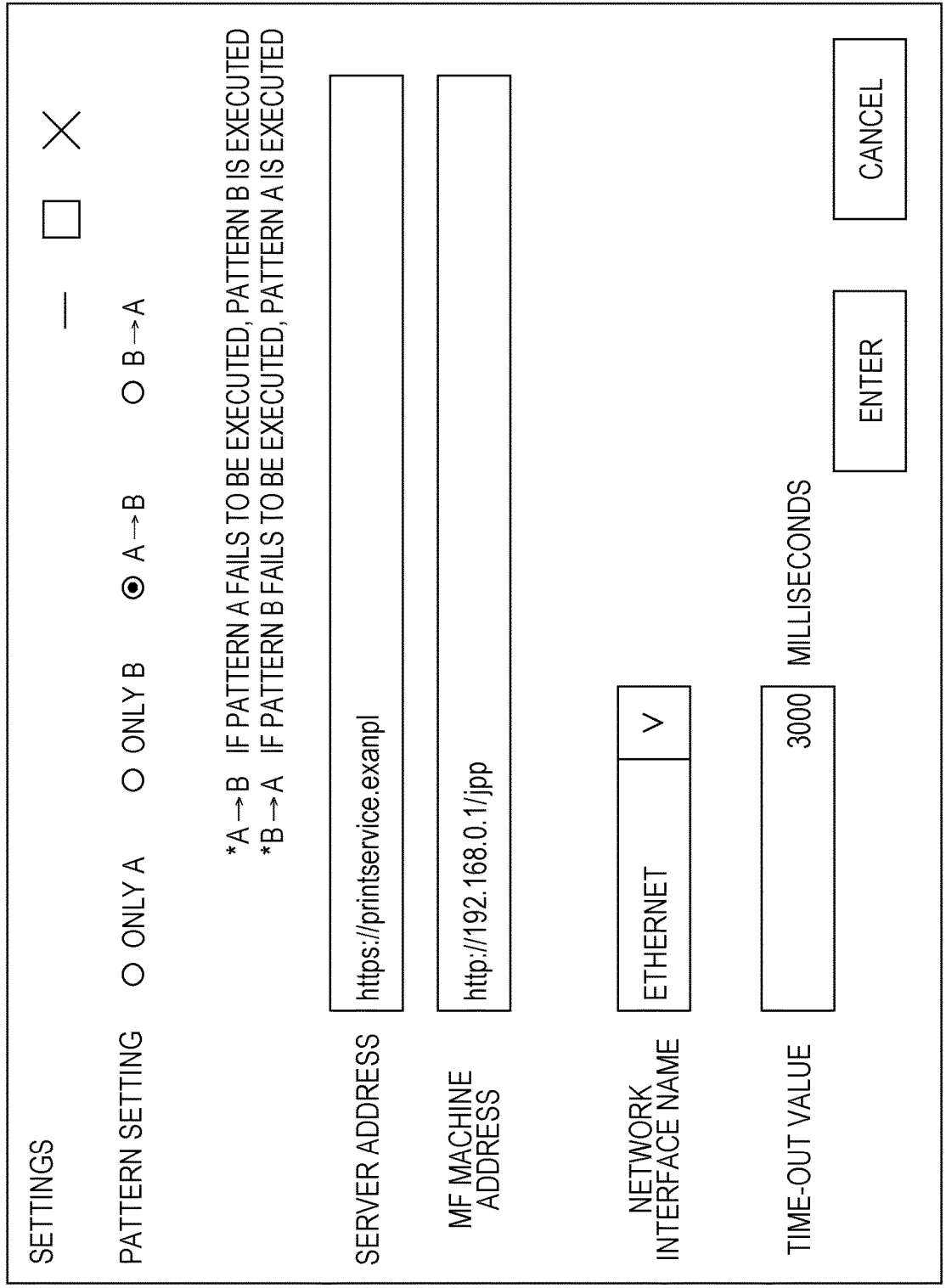
FIG. 6 is a diagram illustrating an example of a setting screen displayed on an information processing apparatus.

Furthermore, in this exemplary embodiment, a processing pattern used when the image forming apparatus 12 performs printing may be set on a setting screen on the information processing apparatus 16. FIG. 6 is a diagram illustrating an example of a setting screen displayed on the information processing apparatus 16.

In the example of FIG. 6, as pattern setting, selection may be made from among four types: only pattern A ("only A" in FIG. 6); only pattern B ("only B" in FIG. 6); pattern B if pattern A fails ("A→B" in FIG. 6); and pattern A if pattern B fails ("B→A" in FIG. 6). In FIG. 6, an example in which "A→B" is selected is illustrated.

Furthermore, on the setting screen illustrated in FIG. 6, the address of the cloud server 14 (server address in FIG. 6), the address of the image forming apparatus 12 (MF machine address in FIG. 6), and a network interface name may be set.

Furthermore, a time-out value for determining whether a processing pattern has failed may be set. When a time set as the time-out value has passed, it is determined that printing has failed.

The server address, the MF machine address, the network interface name, and the time-out value in FIG. 6 may be displayed in the case where an administrator performs an operation and may be non-displayed normally.

Figure 7:
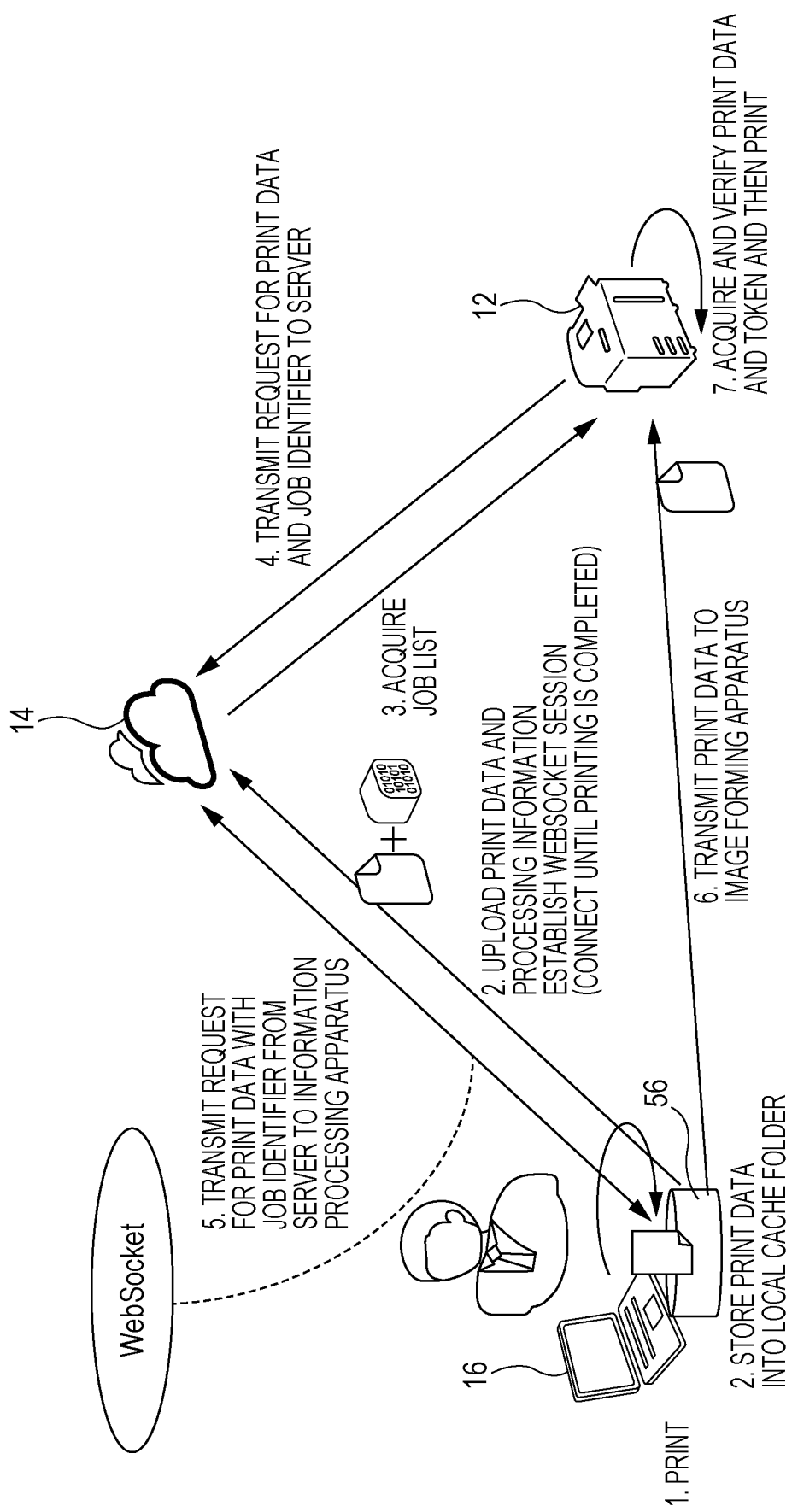
FIG. 7 is a diagram for explaining the procedure of a process performed in the case where an image forming apparatus acquires print data from an information processing apparatus and performs printing in accordance with pattern A in an image forming system according to an exemplary embodiment.

Next, the outline of the procedure of a process performed in the image forming system 10 according to this exemplary embodiment configured as described above will be described. FIG. 7 is a diagram for explaining the procedure of a process performed in the case where the image forming apparatus 12 acquires print data from the information processing apparatus 16 and performs printing in accordance with the pattern A described above in the image forming system 10 according to this exemplary embodiment.

First, a user operates the application 50 of the information processing apparatus 16 to issue a printing instruction.

When the printing instruction is issued, the printer driver 52 generates print data and passes the print data to the resident application 54. The resident application 54 transmits the print data and processing information to the cloud server 14 and stores the print data into the local cache folder 56 of the information processing apparatus 16. Upon transmission of the print data and the processing information to the cloud server 14, the information processing apparatus 16 and the cloud server 14 establish a WebSocket session. The WebSocket represents communication standards for bidirectional communication between a web browser of the information processing apparatus 16 and a web server running on the cloud server 14. By establishing a communication session based on the communication standards, bidirectional communication between the information processing apparatus 16 and the cloud server 14 is enabled.

For printing, the user moves to the location of the image forming apparatus 12, and operates the user interface 22 of the image forming apparatus 12 to acquire a job list from the cloud server 14. A job represents a process or a group of processes performed by the image forming apparatus 12 to implement a predetermined function.

The user operates the user interface 22 of the image forming apparatus 12 to select a target job from the job list, so that the apparatus application 64 of the image forming apparatus 12 transmits a request for the print data and a job identifier for identifying the job to the cloud server 14. A job identifier corresponds to an example of an identifier for identifying print data.

The processing response unit 60 of the cloud server 14 receives the request from the image forming apparatus 12 for the print data. The processing response unit 60 issues a token corresponding to the job identifier of the requested print data, using a communication path established based on a WebSocket protocol, and transmits to the information processing apparatus 16 a request for the print data with the issued token.

In response to the request from the cloud server 14 for the print data, the resident application 54 of the information processing apparatus 16 transmits the print data to the image forming apparatus 12.

Thus, the image forming apparatus 12 acquires the print data and the token. The image forming apparatus 12 verifies the token and performs printing.

Next, the procedure of a specific process performed in the image forming system 10 according to this exemplary embodiment will be described.

Figure 8:
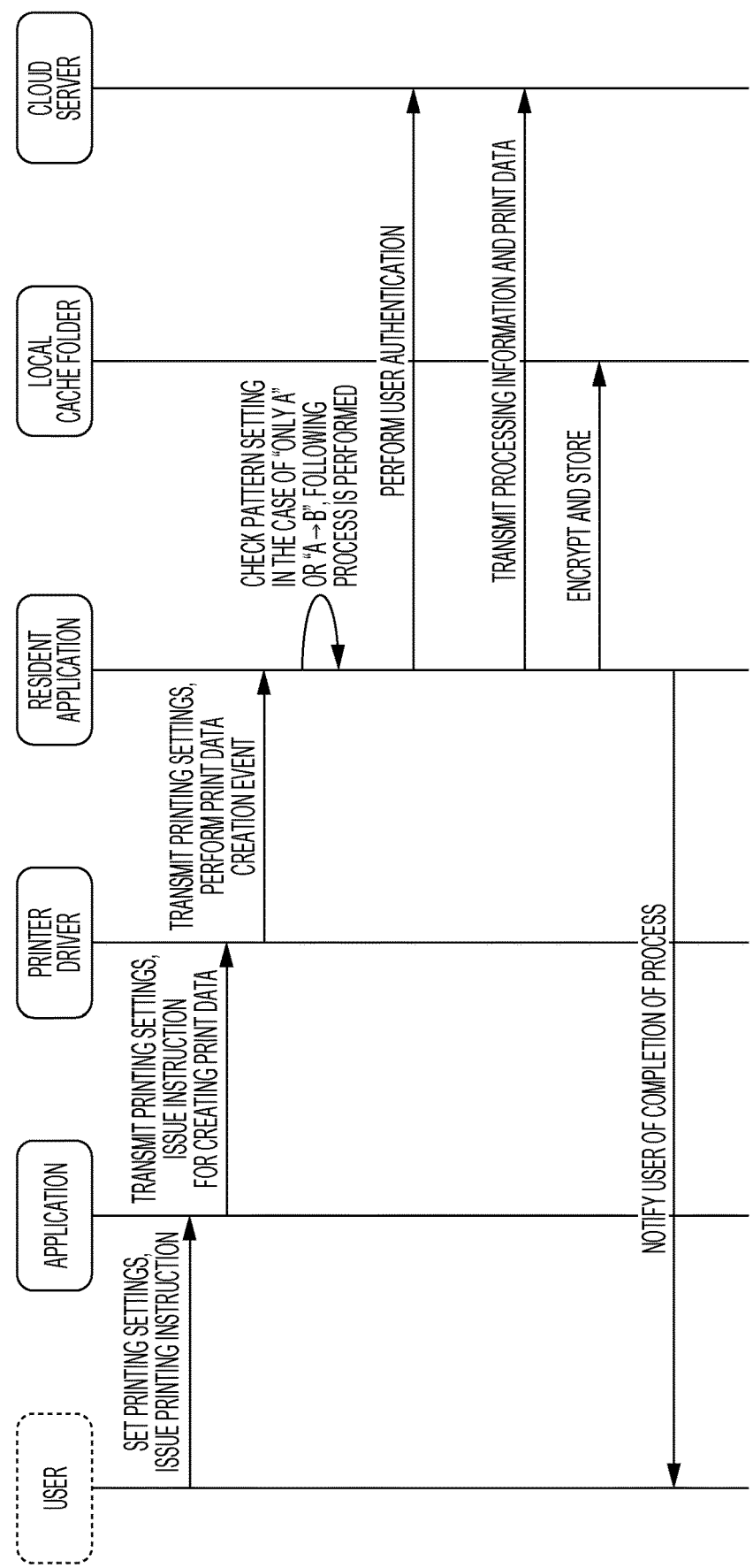
FIG. 8 is a sequence diagram illustrating an example of the procedure of a process for uploading print data to a cloud server in the case where printing is performed in accordance with the pattern A in an image forming system according to an exemplary embodiment.

First, the procedure of a process for uploading print data to the cloud server 14 in the case where printing is performed in accordance with the pattern A will be described. FIG. 8 is a sequence diagram illustrating an example of the procedure of a process for uploading print data to the cloud server 14 in the case where printing is performed in accordance with the pattern A in the image forming system 10 according to this exemplary embodiment.

When a user operates the information processing apparatus 16 to set printing settings on the application 50 and issue a printing instruction, the application 50 transmits the set printing settings to the printer driver 52 to issue an instruction for creating print data.

The printer driver 52 transmits the printing settings to the resident application 54 in response to the instruction for creating print data from the application 50, and executes a print data creation event for creating print data.

The resident application 54 checks pattern setting from the printing settings transmitted from the printer driver 52. The resident application 54 performs a process described below in the case where the setting is such that only the pattern A is executed or the pattern B is executed if the pattern A is not able to be executed.

That is, the resident application 54 performs user authentication for the cloud server 14. In the case where authentication is successful, the resident application 54 transmits a document name, processing information including printing settings, and print data to the cloud server 14. Furthermore, the resident application 54 encrypts the print data, stores the encrypted print data into the local cache folder 56 of the information processing apparatus 16, and notifies the user of completion of the process. Furthermore, upon transmission of the print data and the processing information to the cloud server 14, the information processing apparatus 16 and the cloud server 14 establish WebSocket communication. After the processing information is transmitted to the cloud server 14, the processing information is completely deleted or partially deleted. For example, a document ID is not deleted and remains in the information processing apparatus 16 as part of the processing information.

Figure 9:
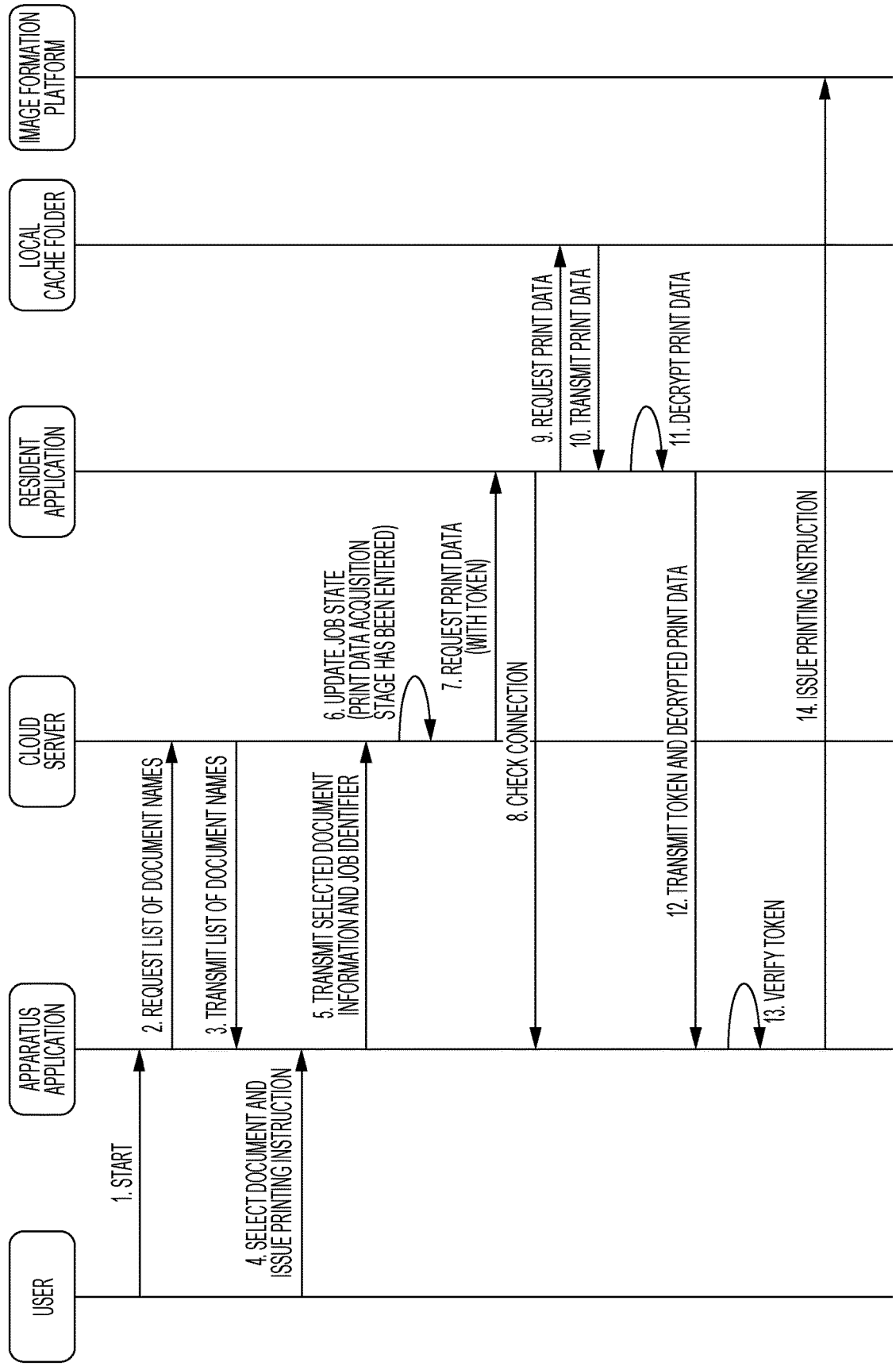
FIG. 9 is a sequence diagram illustrating an example of the procedure of a process performed in the case where, after processing information and print data are uploaded to a cloud server, an image forming apparatus acquires the processing information from the cloud server and acquires the print data from an information processing apparatus in accordance with the pattern A in an image forming system according to an exemplary embodiment.

Next, the procedure of a process performed in the case where, after processing information and print data are uploaded to the cloud server 14, the image forming apparatus 12 acquires the processing information from the cloud server 14 and acquires the print data from the information processing apparatus 16 in accordance with the pattern A, will be described. FIG. 9 is a sequence diagram illustrating an example of the procedure of a process performed in the case where, after processing information and print data are uploaded to the cloud server 14, the image forming apparatus 12 acquires the processing information from the cloud server 14 and acquires the print data from the information processing apparatus 16 in accordance with the pattern A in the image forming system 10 according to this exemplary embodiment.

When a user moves to the front of the image forming apparatus 12 and operates the user interface 22 to start the apparatus application 64, the apparatus application 64 requests the cloud server 14 for the list of document names.

In the cloud server 14, the processing response unit 60 transmits the list of document names in response to the request from the apparatus application 64 for the list of document names.

When the user operates the user interface 22 to select a document name and issue a printing instruction, the apparatus application 64 transmits the selected document information, the job identifier, and the address information of the image forming apparatus 12 to the cloud server 14. At the time of selecting a document name, printing settings may be changed appropriately.

The reception unit 58 of the cloud server 14 receives the document information, the job identifier, and the address information of the image forming apparatus 12 from the apparatus application 64, and the processing response unit 60 of the cloud server 14 performs an update to a job state indicating that a print data acquisition stage has been entered. Then, the processing response unit 60 issues a token as the job identifier, and transmits to the resident application 54 a request for print data with the token. Furthermore, the processing response unit 60 transmits the token issued as the job identifier to the apparatus application 64 of the image forming apparatus 12.

The resident application 54 receives the request for the print data with the token and the address information of the image forming apparatus 12 from the cloud server 14, and checks connection with the apparatus application 64 of the image forming apparatus 12 on the basis of the address information.

In the case where connection between the image forming apparatus 12 and the information processing apparatus 16 is confirmed, the resident application 54 requests the local cache folder 56 for the print data. In contrast, in the case where connection between the image forming apparatus 12 and the information processing apparatus 16 is not able to be confirmed, the resident application 54 notifies the cloud server 14 that connection is not able to be performed. Thus, the cloud server 14 transmits the print data to the image forming apparatus 12, and the apparatus application 64 thus acquires image data.

The local cache folder 56 transmits the requested print data to the resident application 54.

The resident application 54 decrypts the encrypted print data acquired from the local cache folder 56. The resident application 54 transmits the token and the decrypted print data to the apparatus application 64.

The apparatus application 64 verifies the token. That is, the resident application 54 checks whether the token and the job identifier of the job specified by the apparatus application 64 match. In the case where the token and the job identifier match, the resident application 54 issues a printing instruction to the image formation platform 66. Accordingly, the image formation platform 66 performs printing by forming an image based on the print data. The resident application 54 may suspend reception of a printing request from other users until verification of the token by the apparatus application 64 is completed.

As described above, in the image forming system 10 according to this exemplary embodiment, print data stored in the local cache folder 56 of the information processing apparatus 16 is not requested from the image forming apparatus 12 but is requested from the cloud server 14. Thus, the information processing apparatus 16 does not need to be kept in a state in which the information processing apparatus 16 is able to receive a data acquisition request from the image forming apparatus 12. Therefore, compared to the case where the information processing apparatus 16 is kept in the state in which the information processing apparatus 16 is able to receive a data acquisition request, security is improved.

In the exemplary embodiment described above, the information processing apparatus 16 acquires, by using a WebSocket, a request from the cloud server 14 for print data. However, the information processing apparatus 16 does not necessarily acquire a request for print data in accordance with the method described above. For example, the resident application 54 of the information processing apparatus 16 may acquire a job state by periodically communicating with the cloud server 14 by polling, maintaining connection with the cloud server 14 by long polling, or performing processing in other methods and confirm that the print data acquisition stage has been entered. Thus, the resident application 54 may acquire a request for print data and transmit the print data to the image forming apparatus 12.

Furthermore, in the foregoing exemplary embodiment, an example in which the processing response unit 60 of the cloud server 14 is configured to issue a token for identifying a job has been described. However, the token is not necessarily issued as described above. When issuing a printing instruction, the apparatus application 64 of the image forming apparatus 12 may issue a token for identifying a print job in response to the printing instruction and transmit a request for print data along with the token to the cloud server 14. Then, the cloud server 14 may transmit the request for the print data along with the token to the resident application 54 of the information processing apparatus 16.

Furthermore, processes performed by units in the image forming system 10 according to the foregoing exemplary embodiment may be performed by software, hardware, or a combination of software and hardware. Furthermore, processes performed by units in the image forming system 10 may be stored as programs in a storing medium and distributed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
when receiving an image forming instruction issued to an image forming apparatus, transmit image data and processing information to a server, the processing information including information for forming an image represented by the image data, and store the image data into the information processing apparatus; and
in response to a request from the server for transmission of the image data,
upon determining that the information processing apparatus is able to connect to the image forming apparatus, perform control for transmitting the image data to the image forming apparatus; and
upon determining that the information processing apparatus is not able to connect to the image forming apparatus, perform control to cause the image forming apparatus to retrieve the image data from the server.

2. The information processing apparatus according to claim 1, wherein the processor is configured to establish WebSocket communication with the server and receive a request from the server for the image data.

3. The information processing apparatus according to claim 2, wherein the processor is configured to, upon transmission of the image data and the processing information to the server, establish a WebSocket session.

4. The information processing apparatus according to claim 3, wherein the processor is configured to receive a request from the server for transmission of the image data with an identifier for identifying the image data, and transmit the identifier and the image data to the image forming apparatus.

5. The information processing apparatus according to claim 2, wherein the processor is configured to receive a request from the server for transmission of the image data with an identifier for identifying the image data, and transmit the identifier and the image data to the image forming apparatus.

6. The information processing apparatus according to claim 1, wherein the processor is configured to receive a request from the server for transmission of the image data with an identifier for identifying the image data, and transmit the identifier and the image data to the image forming apparatus.

7. The information processing apparatus according to claim 1, wherein the processor is configured to, in a case where the information processing apparatus is not able to connect to the image forming apparatus, notify the server that the information processing apparatus is not able to connect to the image forming apparatus.

8. An image forming apparatus comprising:
a processor configured to:
acquire processing information including information for forming an image represented by image data from a server;
select between acquisition of the image data from the server and acquisition of the image data from an information processing apparatus, and transmit a request for transmission of the image data to the server in a case where the acquisition of the image data from the information processing apparatus is selected; and
perform control for receiving the image data from the information processing apparatus and performing image formation in accordance with the received image data and the processing information,
wherein the processor is configured to, in a case where the image forming apparatus is not able to receive the image data from the information processing apparatus, receive the image data from the server.

9. The image forming apparatus according to claim 8, wherein the processor is configured to perform control for transmitting to the server the request for transmission of the image data to which an identifier for identifying the image data is added, receiving the image data with the identifier from the information processing apparatus, and performing, in a case where the identifier transmitted to the server and the identifier received from the information processing apparatus match, image formation.

10. The image forming apparatus according to claim 9, wherein the processor is configured to suspend reception of a request from another user for image formation until verification as to whether the identifiers match is completed.

11. An image forming system comprising:
    an information processing apparatus;
    an image forming apparatus; and
    a server that is able to connect to the information processing apparatus and the image forming apparatus,
    wherein the information processing apparatus includes a first processor configured to:
        when receiving an image forming instruction issued to the image forming apparatus, transmit image data and processing information to the server, the processing information including information for forming an image represented by the image data, and store the image data into the information processing apparatus; and
        perform control for transmitting the image data to the image forming apparatus in response to a request from the server for transmission of the image data, and
    wherein the image forming apparatus includes a second processor configured to:
        acquire the processing information from the server;
        select between acquisition of the image data from the server and acquisition of the image data from the information processing apparatus, and transmit a request for transmission of the image data to the server in a case where the acquisition of the image data from the information processing apparatus is selected; and
        perform control for receiving the image data from the information processing apparatus and performing image formation in accordance with the received image data and the processing information,
        wherein the second processor is configured to, in a case where the image forming apparatus is not able to receive the image data from the information processing apparatus, receive the image data from the server.

12. A non-transitory computer readable medium storing a program causing a computer to execute a process for information processing, the process comprising:
    when receiving an image forming instruction issued to an image forming apparatus, transmitting image data and processing information to a server, the processing information including information for forming an image represented by the image data, and storing the image data into an information processing apparatus; and
    in response to a request from the server for transmission of the image data,
        upon determining that the computer is able to connect to the image forming apparatus, performing control for transmitting the image data to the image forming apparatus; and
        upon determining that the computer is not able to connect to the image forming apparatus, perform control to cause the image forming apparatus to retrieve the image data from the server.

13. A non-transitory computer readable medium storing a program causing a computer to execute a process for image formation, the process comprising:
    acquiring processing information including information for forming an image represented by image data from a server;
    selecting between acquisition of the image data from the server and acquisition of the image data from an information processing apparatus, and transmitting a request for transmission of the image data to the server in a case where the acquisition of the image data from the information processing apparatus is selected;
    performing control for receiving the image data from the information processing apparatus and performing image formation in accordance with the received image data and the processing information; and
    in a case where the computer is not able to receive the image data from the information processing apparatus, receiving the image data from the server.

* * * * *